No. 827,163. PATENTED JULY 31, 1906.
B. J. LINDGREN & J. HUMELBUEHLER.
SEAMING MACHINE FOR SHEET METAL ARTICLES.
APPLICATION FILED JAN. 31, 1906.

2 SHEETS—SHEET 1.

Witnesses:
R. W. Rumor.
E. A. Volk.

Inventors,
Bror J. Lindgren,
John Humelbuehler,
by William Parker Hard, Attorneys No. 827,163. PATENTED JULY 31, 1906.
B. J. LINDGREN & J. HUMELBUEHLER.
SEAMING MACHINE FOR SHEET METAL ARTICLES.
APPLICATION FILED JAN. 31, 1906.
2 SHEETS—SHEET 2.
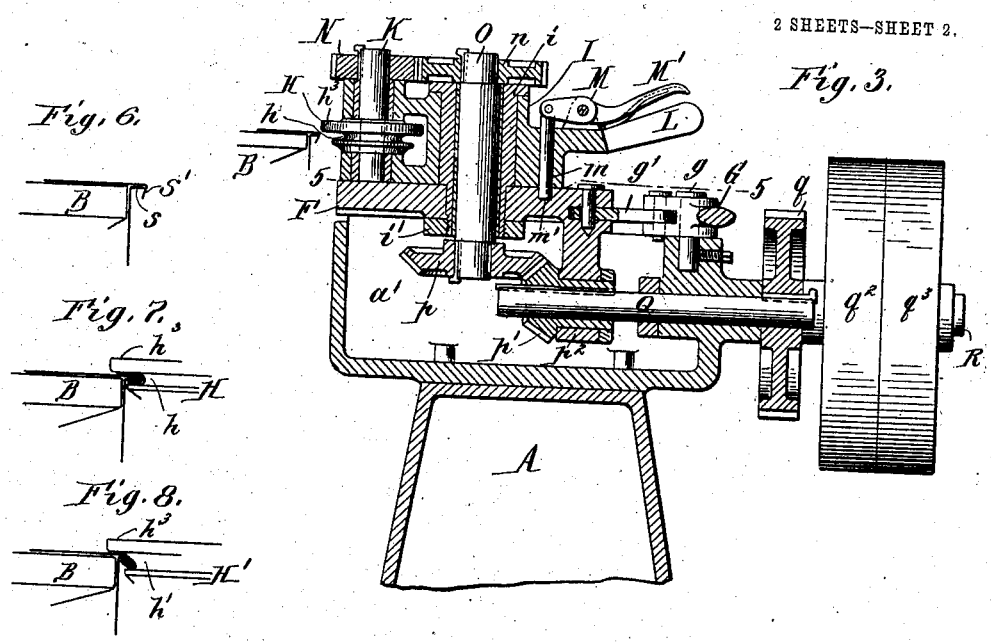
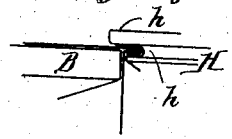
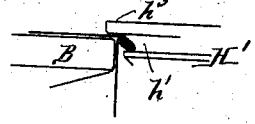
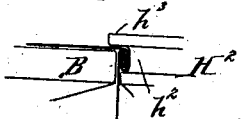
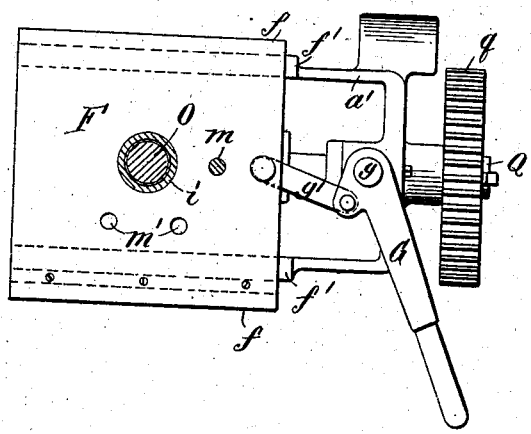
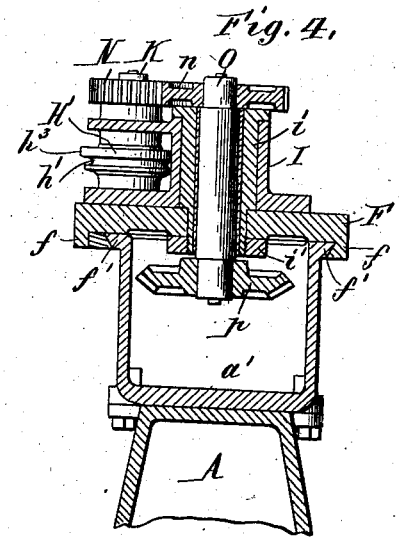
Witnesses:—
R. W. Renner.
E. A. Vock.
Inventor,
Bror J. Lindgren
John Humelbuehler,
by Wilhelm, Parker & Hard
Attorneys
THE NORRIS PETERS CO., WASHINGTON, D. C.

UNITED STATES PATENT OFFICE.

BROR J. LINDGREN AND JOHN HUMELBUEHLER, OF BUFFALO, NEW YORK, ASSIGNORS TO NIAGARA MACHINE & TOOL WORKS, OF BUFFALO, NEW YORK.

SEAMING-MACHINE FOR SHEET-METAL ARTICLES.

No. 827,163.　　　　Specification of Letters Patent.　　　　Patented July 31, 1906.

Application filed January 31, 1906. Serial No. 298,792.

*To all whom it may concern:*

Be it known that we, BROR J. LINDGREN and JOHN HUMELBUEHLER, citizens of the United States, residing at Buffalo, in the county of Erie and State of New York, have invented a new and useful Improvement in Seaming-Machines for Sheet-Metal Articles, of which the following is a specification.

This invention relates more particularly to seaming-machines of that kind used for attaching the bottoms or ends to the circular bodies of cans, tubs, tanks, and other articles of large diameter by the well-known double seam or fold; and the machine hereinafter described is especially adapted for working comparatively heavy sheet metal.

The principal object of the invention is to produce a machine capable of easy and rapid operation which is of simple and inexpensive construction and is suitable for joining the ends and bodies of vessels or articles differing greatly in size and to so construct the machine that large heavy work can be done upon it with the minimum exertion upon the part of the operator.

To this end the machine comprises a mandrel or disk upon which the work is loosely supported and a series of seaming-rolls, which are positively driven and are movably mounted, so as to be successively presented to the work, the rolls being so shaped and arranged as to hold the article in position upon the mandrel while forming the seam and in part at least relieve the operator from this task.

Figure 1:
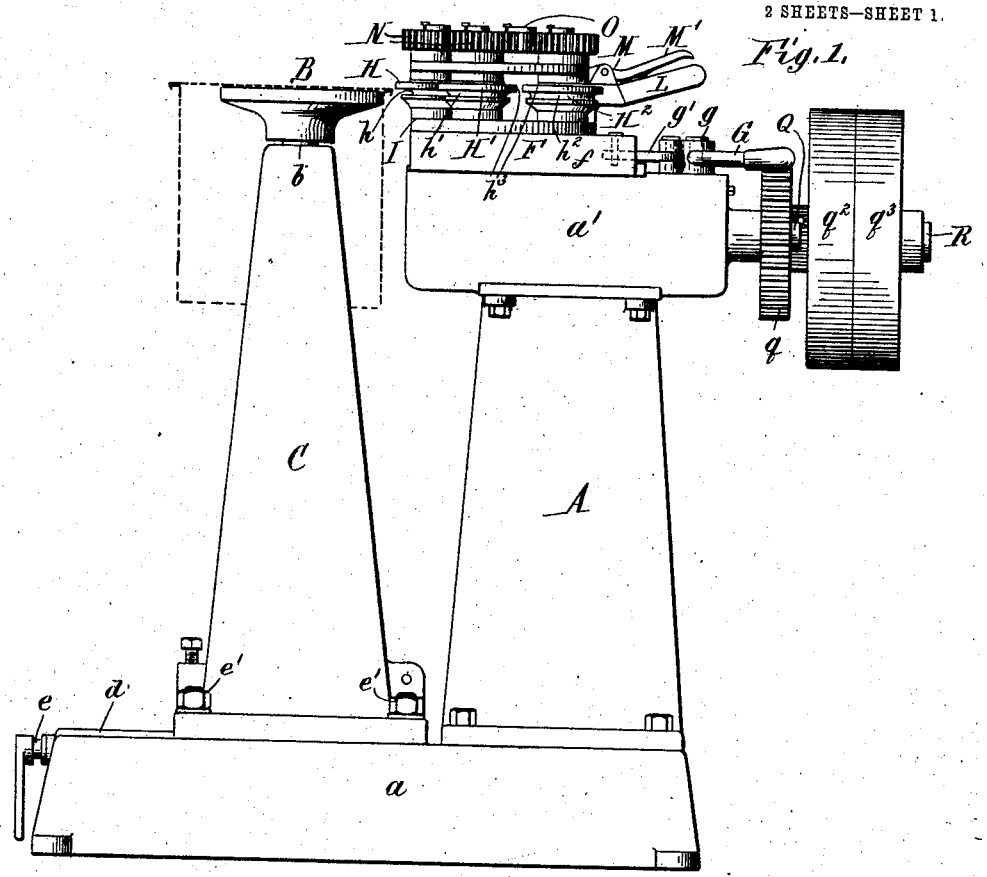
Figure 2:
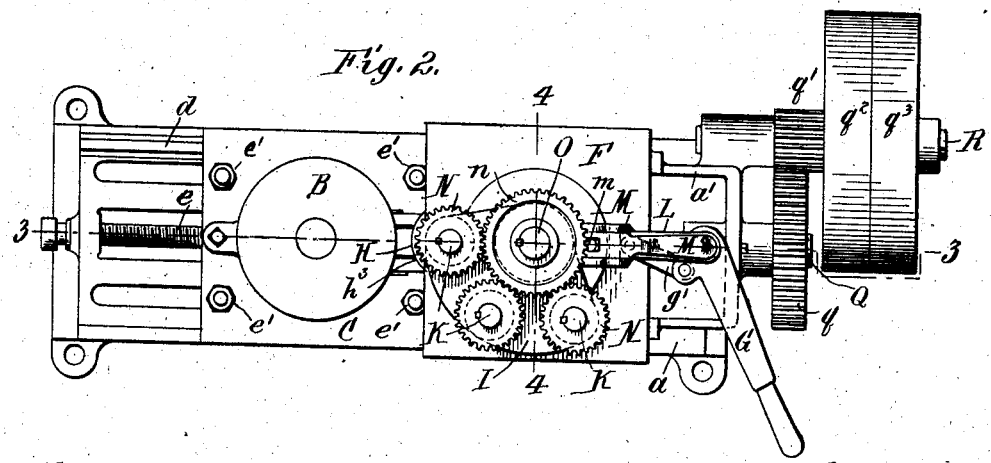

In the accompanying drawings, consisting of two sheets, Figure 1 is a front elevation of a double-seaming machine embodying the invention. Fig. 2 is a plan view thereof. Fig. 3 is a fragmentary longitudinal sectional elevation, on an enlarged scale, of the upper portion of the machine in line 3 3, Fig. 2. Fig. 4 is a transverse sectional elevation of the upper portion of the machine in line 4 4, Fig. 2. Fig. 5 is a fragmentary plan view of the machine, partly in horizontal section, in line 5 5, Fig. 3. Figs. 6, 7, 8, and 9 are detail views illustrating the several steps of forming a double seam of the kind for which the machine is used.

Like letters of reference refer to like parts in the several figures.

A represents the main frame or support of the machine, which consists, preferably, of a standard secured on a suitable base $a$ and surmounted by a hollow box or rectangular casting $a'$.

B represents a circular mandrel or disk, upon which the work is placed and supported while forming the seam. The mandrel is loosely supported, so as to be free to revolve—as, for instance, by a spindle $b$, secured to the mandrel and journaled in an upright pedestal C, rising from the base of the frame. The mandrel is adjusted toward and from the frame-standard by moving its pedestal, which is arranged, as usual, to slide upon tracks or ways $d$ on the base and is moved by an adjusting-screw $e$. Clamping-bolts $e'$ are shown for rigidly securing the pedestal after adjustment. Any other usual or suitable means for effecting the necessary adjustments of the mandrel could be employed.

F represents a carriage on which the seaming-rolls are mounted and which is movable on the frame in any suitable manner toward and from the mandrel to advance and retract the rolls. In the construction shown the carriage is provided at opposite sides with depending flanges $f$, which are grooved to receive undercut guide-flanges $f'$, projecting outwardly from the upper portions of the sides of the frame. Some suitable operating device is provided for reciprocating the carriage on its ways, the device shown consisting of a hand-lever G, which is fulcrumed on a vertical pin $g$, fixed on the upper portion of the frame, and has a short arm projecting toward the carriage, to which it is connected by a link $g'$. The link and short arm of the hand-lever form a toggle-joint, whereby the carriage can be pressed toward the mandrel with great force.

The seaming-rolls H H' H² are movably mounted on the slide-carriage, so that they can be successively moved into operative position to engage the seam-flanges of the article when the carriage is advanced, and they are all positively driven.

The seaming-rolls have grooved or otherwise properly formed parts $h$ $h'$ $h^2$, respectively, for performing the successive steps of the seam-forming operation, and each roll has a relatively wide outwardly-projecting flange $h^3$, adapted to overhang the mandrel and bear on the bottom or end of the article to hold the same down on the mandrel.

The seaming-rolls are mounted and driven by the following means in the machine shown: I represents a roll-turret pivoted to turn horizontally on the carriage about a vertical hollow post $i$, which has a reduced lower part secured in a vertical socket in the carriage by a nut $i'$, screwed on the threaded lower end of the post. The turret has upper and lower horizontal flanges or parts between which the seaming-rolls are located, each roll being fixed to a vertical shaft K, journaled at opposite ends in bearing-holes in the upper and lower flanges of the turret. The seaming-rolls are arranged in the arc of a circle concentric with the pivot-post for the turret, so that by turning the latter the several rolls can be successively brought to the same operative position opposite to the mandrel which is occupied by the roll H in Figs. 1, 2, and 3. The turret has a projecting handle or part L for turning it and a latch device M for locking it in the different positions necessary to hold the several rolls in operative position. The latch shown consists of a spring-pressed lever $M'$, arranged parallel with and pivoted to the turret-handle and connected to a bolt $m$, which is slidable in a vertical hole in the turret and is adapted to engage in either of a series of holes $m'$ in the top of the carriage. The bolt-holes are arranged in the arc of a circle about the turret-pivot and are so spaced that by engaging the bolt in the successive holes the successive seaming-rolls will be held in operative position opposite to the mandrel. The turret is released by pressing on the outer end of the latch-lever and can then be turned to the desired position and again locked by releasing the latch-lever. A gear-pinion N is secured to the upper end of each roll-shaft and meshes with a gear-wheel $n$, secured to the upper end of a vertical shaft O, which passes through and is journaled in the hollow pivot-post for the turret and has a bevel gear-wheel $p$ secured to its lower end. A bevel gear-wheel $p'$, meshing with the bevel gear-wheel $p$, is journaled in a bearing-lug $p^2$, depending from the carriage, and is splined or otherwise secured to a horizontal counter-shaft Q in such manner that it turns with said shaft, but can slide thereon in the movements of the carriage and always maintain its engagement with the gear-wheel on the vertical shaft. The counter-shaft Q is journaled in a suitable bearing on the frame and is geared, as by wheels $q\ q'$, to a drive-shaft R, which is journaled on the frame and is provided with the usual tight and loose belt-pulleys $q^2\ q^3$. This mechanism positively drives the seaming-rolls and allows the carriage to be reciprocated on its ways and also enables the roll-turret to be turned on its pivot. In turning the turret the gear-wheels on the roll-shafts roll around on the gear on the central vertical shaft. Any other suitable drive mechanism for the seaming-rolls thus permitting the movement of the carriage and rotary adjustment of the turret could be employed.

The operation of the machine is as follows: The turret is set in the position shown in Figs. 1, 2, and 3 with the first seaming-roll H in operative position opposite to the mandrel. The body and bottom or end of the article are provided, respectively, with the usual outwardly-projecting flange $s$ and longitudinally-extending flange $s'$, Fig. 6, and the body-flange is loosely engaged in the bottom flange. The loosely-engaged body and end are placed over the mandrel B, with the end resting thereon, as indicated by broken lines in Fig. 1. The roll-drive mechanism is then started, and the operator swings the hand-lever G to advance the carriage and move the first roll H against the seam-flanges. The positively-driven seaming-roll being forcibly pressed against the flanged end of the vessel causes the same and the mandrel to rotate, and the roll, being suitably shaped, turns the flange $s'$ of the end inwardly under the outwardly-projecting flange $s$ of the body, as indicated in Fig. 7. When the end flange is completely turned in under the body-flange, the carriage is retracted and the turret is turned to bring the second roll $H'$ into operative position opposite the mandrel and is locked by the latch. The carriage is again advanced by the hand-lever G and the second roll forced against the work. This roll is properly shaped to bend the partially-formed seam down, as indicated in Fig. 8, and after it performs its function the carriage is again retracted, the turret again set to bring the third roll $H^2$ into operative position, and the carriage is a third time advanced. The third roll is shaped to press or flatten the downbent seam in against the body of the vessel, as shown in Fig. 9, and completes the seam. The seam is thus completed in the machine described in three steps by three rolls. The invention is not, however, limited to the form and number of the rolls described, and any number of rolls of the necessary shape adapted for the particular work to be performed can be used without in any wise departing from the principle of construction and operation of the machine.

It will be observed that the seaming-rolls are arranged on vertical axes or substantially parallel with the mandrel and are advanced horizontally or in a direction substantially parallel with the end face of the mandrel and end of the article. When the roll is in engagement with the article, its wide flange $h^3$, overhanging the end of the article, will guide the same as it is rolled between the mandrel and seaming-roll and hold it in place on the mandrel, so that it is only necessary for the operator to steady the article with one hand while he operates the hand-lever G with the other hand. The mandrel does not have to fit the article. It is only necessary for it to bear against the body of the article adjacent to the seaming-roll and have a sufficiently large end face to enable the article to be readily held flat thereon by hand. Consequently one-sized mandrel will serve for seaming articles differing very largely in diameter. Owing to the described construction of the seaming-rolls and their relation to the mandrel, articles of comparatively heavy gage sheet metal can be double-seamed with facility and with the minimum exertion.

We claim as our invention—

1. The combination of a mandrel upon which the article is supported, a seaming-roll journaled substantially parallel with said mandrel, means for positively driving the seaming-roll, and means for moving the positively-driven seaming-roll toward the mandrel in a plane substantially parallel with the end of the mandrel, said roll having a portion which overhangs the mandrel to hold the article thereon, said mandrel being free to revolve and being rotated only by the friction of the article thereon, substantially as set forth.

2. The combination of a mandrel upon which the article is loosely supported, a plurality of seaming-rolls adjustably mounted to be successively moved into the same operative position, means for positively driving said seaming-rolls, and means for moving each positively-driven roll toward the mandrel to engage the article, substantially as set forth.

3. The combination of a mandrel upon which the article is supported, a plurality of seaming-rolls adjustably mounted to be moved successively into operative position, means for positively driving said seaming-rolls, and means for moving each positively-driven seaming-roll toward the mandrel to engage the article, said rolls having flanges substantially parallel with the end face of the mandrel and adapted to overhang the same to hold the article in position thereon, substantially as set forth.

4. The combination of a mandrel upon which the article is loosely supported, a plurality of seaming-rolls, a support on which said rolls are adjustably mounted to be successively moved into the same operative position, means for positively driving said seaming-rolls, and means for moving said support to advance and retract each roll to and from the article, substantially as set forth.

5. The combination of a mandrel upon which the article is supported, a carriage which is movable toward and from said mandrel, a turret which is rotatably adjustable on said carriage, a plurality of seaming-rolls journaled on said turret and adapted to be successively moved into operative position by adjusting said turret, means for positively driving said seaming-rolls, and means for operating said carriage to advance and retract the rolls to and from the article, substantially as set forth.

6. The combination of a mandrel upon which the article is supported, a carriage which is movable toward and from said mandrel, a turret which is rotatably adjustable on said carriage, a plurality of seaming-rolls journaled on said turret and adapted to be successively moved into operative position by adjusting said turret, a shaft journaled concentrically with the pivotal axis of said turret and geared to said seaming-rolls, a driven shaft, gearing connecting said shafts and constructed to allow the movement of said carriage, and means for operating said carriage to advance and retract the seaming-rolls to and from the article, substantially as set forth.

Witness our hands this 24th day of January, 1906.

BROR J. LINDGREN.
JOHN HUMELBUEHLER.

Witnesses:
FRANCIS LOONEY,
JOHN HICKOK.